United States Patent [19]
Takeuchi et al.

[11] Patent Number: 5,034,912
[45] Date of Patent: Jul. 23, 1991

[54] SIGNAL PROCESSING CIRCUIT FOR MULTIPLICATION

[75] Inventors: Sumitaka Takeuchi; Hiroyuki Kouno, both of Hyogo, Japan

[73] Assignee: Mitsubishi Denki Kabushiki Kaisha, Tokyo, Japan

[21] Appl. No.: 462,379

[22] Filed: Jan. 9, 1990

[30] Foreign Application Priority Data

Jun. 29, 1989 [JP] Japan .................. 1-167604

[51] Int. Cl.$^5$ ............................................. G06F 7/52
[52] U.S. Cl. ................................................... 364/754
[58] Field of Search ............... 364/754, 755, 756, 757, 364/760, 841; 341/144, 153

[56] References Cited

U.S. PATENT DOCUMENTS

| 4,578,668 | 3/1986 | Sugimoto | 341/153 |
| 4,667,179 | 5/1987 | Law et al. | 341/153 |
| 4,673,917 | 6/1987 | Urschel et al. | 341/153 |
| 4,745,569 | 5/1988 | Yamaoka et al. | 364/755 |
| 4,831,577 | 5/1989 | Wei et al. | 364/760 |
| 4,887,232 | 12/1989 | Wolrich et al. | 364/754 |
| 4,896,284 | 1/1990 | Takeuchi et al. | 364/754 |

OTHER PUBLICATIONS

S. Freeny, "Special Purpose Hardware for Digital Filtering" Proceedings of the IEEE, vol. 63, No. 4, Apr. 1975, pp. 633-648.

Primary Examiner—Dale M. Shaw
Assistant Examiner—Long T. Nguyen
Attorney, Agent, or Firm—Lowe, Price, LeBlanc and Becker

[57] ABSTRACT

A multiplication processing circuit requiring no digital-analog converter includes a circuit for multiplying a digital multiplication coefficient by a digital multiplicand and outputting the result of multiplication as an analog current signal. The multiplication processing circuit includes a circuit for decoding the digital multiplication coefficient to generate one or a plurality of control signals, a circuit responsive to the digital multiplicand and to the generated control signal for generating a signal indicating, in decimal notation, the result of multiplication of the digital multiplication coefficient by the digital multiplicand, and a circuit for converting the signal indicating the result of multiplication into an analog current signal of a corresponding magnitude. Each of the control signals indicates at least one digital multiplication coefficient in decimal notation. The circuit for generating the signal indicative of the result of multiplication includes a circuit for logically processing, by logic gates, the control signal and the digital multiplicand. The logic gate circuit includes a circuit for detecting coincidence/non-coincidence between a pattern of the generated control signal and a bit pattern of the digital multiplicand, and a circuit responsive to the output of the detecting circuit for activating one of a plurality of possible signals indicating the results of multiplication.

8 Claims, 8 Drawing Sheets

FIG.5A

| X1 | 0 | 1 | 1 | 2 | 2,3 | 3 |
|---|---|---|---|---|---|---|
| X0 | 1 | 2 | 1,3 | 0 | 2 | 3 |
| | A1 | A2 | A3 | A4 | A6 | A9 |

FIG.5B

| X1 | S0 | S1 | S1 | S2 | S5 | S3 |
|---|---|---|---|---|---|---|
| X0 | S1 | S2 | S4 | S0 | S2 | S3 |
| | A1 | A2 | A3 | A4 | A6 | A9 |

$S_0 = 0$ $S_1 = 1$ $S_2 = 2$ $S_3 = 3$ $S_4 = 1 \cup 3$ $S_5 = 2 \cup 3$ $S_0 = \overline{C_0} \cdot \overline{C_1}$ $S_1 = C_0 \cdot \overline{C_1}$ $S_2 = \overline{C_0} \cdot C_1$ $S_3 = C_0 \cdot C_1$ $S_4 = C_0 \cdot \overline{C_1} + C_0 \cdot C_1 = C_0$ $S_5 = \overline{C_0} \cdot C_1 + C_0 \cdot C_1 = C_1$

| C0 | C1 |
|----|----|
| 1  | 1  |

COEFFICIENT (MULTIPLIER) = 3

FIG. 9(b)

| X0 | X1 |
|----|----|
| 0  | 1  |

INPUT (MULTIPLICAND) = 2

FIG. 9(c)

| S0 | S1 | S2 | S3 | S4 | S5 |
|----|----|----|----|----|----|
| 0  | 0  | 0  | 1  | 1  | 1  |

FIG. 9(d)

| A1 | A2 | A3 | A4 | A6 | A9 |
|----|----|----|----|----|----|
| 0  | 0  | 0  | 0  | 1  | 0  |

FIG. 9(e)     $I = I_6$     OUTPUT = 6

SIGNAL PROCESSING CIRCUIT FOR MULTIPLICATION

BACKGROUND OF THE INVENTION

1. Field of the Invention

The present invention relates to a signal processing circuit for multiplication and, more specifically, to a structure of a digital filter suitable for higher degree of integration.

2. Description of the Background Art

Recently, signal processing which has been carried out in an analog manner has come to be carried out digitally in various fields. A circuit structure called a digital filter is one device that performs digital signal processing. FIG. 1 schematically shows a structure of a signal processing apparatus employing a conventional digital filter.

Referring to FIG. 1, the signal processing circuit comprises a digital filter 11 and a D/A converter 12 for converting digital signals into analog signals. The digital filter 11 receives a digital signal X sampled at a prescribed period through an input terminal 1 and a digital signal C determining characteristics of the filter through an input terminal 2. The digital filter 11 processes the digital signal X in accordance with the filter characteristics determined by the digital signal C, and outputs the result of processing to the D/A converter 12.

The D/A converter 12 converts the digital signal from the digital filter 11 into an analog signal which is outputted as an output signal I at an output terminal 3.

FIG. 2 shows one example of a specific structure of the digital filter 11 shown in FIG. 1. The filter structure shown in FIG. 2 is generally known as a FIR (Finite Impulse Response) type digital filter. Referring to FIG. 2, the digital filter 11 comprises three stages of cascade connected delay circuits 4a, 4b and 4c, multipliers 13a, 13b, 13c and 13d multiplying the input signal X and the outputs from the respective delay circuits 4a to 4c by corresponding coefficients Ca to Cd, respectively, to output the results, and an adder 14 for adding the outputs from the multipliers 13a to 13d. Each of the delay circuits 4a to 4c delays an applied signal for a prescribed time period, and outputs the same in response to a clock signal from a clock generator, not shown.

The multiplier 13a multiplies the digital signal X from the input terminal 1a by the multiplication coefficient Ca to output the result. The multiplier 13b multiplies the output from the delay circuit 4a by the multiplication coefficient Cb to output the result. The multiplier 13c multiplies the output from the delay circuit 4b by the multiplication coefficient Cc to output the result. The multiplier 13d multiplies the output from the delay circuit 4c by the multiplication coefficient Cd to output the result. A digital output signal Y is outputted from the adder 14.

The multiplication coefficients Ca, Cb, Cc and Cd are applied to the multipliers 13a to 13d through terminals 2a, 2b, 2c and 2d. By changing the values of the multiplication coefficients (digital signals) Ca, Cb, Cc, and Cd, the multiplication values in the multipliers 13a to 13d are changed, so that the characteristics of the digital filter 11 can be changed.

When a signal processing which has been carried out by an analog filter is to be done by a digital filter, the output of the digital filter must be converted to an analog signal through the D/A converter 12, as shown in FIG. 1. Generally, the D/A converter 12 is formed on a chip separate from the digital filter, thereby increasing the size of the signal processing apparatus.

A conventional digital filter, one example of which is shown in FIG. 2, comprises delay circuits, multipliers and an adder. The speed of operation of the multipliers must be increased to realize a high speed digital filter. However, since these multipliers generally consist of full adders, ripple carries and the like must be generated for transmitting carries to the next stages, so that delays are generated due to the carries. In addition, the maximum propagation path of the signal is elongated for generating such carry, which decreases the speed of operation in the multipliers. These problems become more conspicuous as the bit length of the digital signals to be processed becomes longer.

Even when the multiplication coefficients of the digital filter are set in advance and fixed during the operation of the filter, the maximum propagation path of the signal in the multipliers is kept as it is. Therefore, the fact that the maximum propagation path of the signal becomes longer leads to signal propagation delay in the multipliers, which prevents high speed multiplication.

In order to increase the speed of operation of the multipliers, the structure of the multiplier may be implemented in pipelines. In that case, however, the structure of the apparatus becomes complicated and the area of the circuitry is increased.

The general structure of the FIR digital filter, examples and methods of implementing filter elements such as adders and multipliers included in the digital filter are disclosed in "Special-Purpose Hardware for Digital Filtering", S. L. FREENY, Proceedings of the IEEE, Vol. 63, No. 4, April 1975, pp. 633-648.

SUMMARY OF THE INVENTION

An object of the present invention is to provide an improved signal processing apparatus adapted to eliminate the above described drawbacks of the conventional signal processing apparatuses.

Another object of the present invention is to provide a signal processor suitable for realizing higher degree of integration in which it is unnecessary to separately provide a D/A converter.

A further object of the present invention is to provide a signal processing circuit for multiplication having a simple circuit structure enabling high speed multiplication.

A further object of the present invention is to provide a signal processing apparatus for multiplication in which output signals indicative of the result of multiplication can be provided as analog signals.

A still further object of the present invention is to provide a signal processing apparatus for multiplication for implementing a compact and high speed digital filter.

A still further object of the present invention is to provide a compact and high speed digital filter suitable for realizing higher degree of integration, in which filtered output signals can be outputted as analog signals.

The signal processing circuit for multiplication in accordance with the present invention comprises a circuit responsive to a first digital signal which is to be a multiplier (multiplication coefficient) for generating one or a plurality of control signals, a circuit responsive to the output signal from the control signal generating circuit and to a second digital signal which is to be a multiplicand for generating a signal indicative of the result of multiplication of the first and second digital signals, and a circuit for converting the signal indicative of the result of multiplication into an analogue current signal.

Preferably, each of the control signals generated from the control signal generating circuit indicates a multiplication coefficient in decimal notation. The control signals in decimal notation are prepared in advance corresponding to possible multiplication coefficients. The control signal generating circuit generates at least one control signal out of the prepared control signals in response to the first digital signal.

The means for generating a signal indicative the result of multiplication comprises means for logically processing the generated control signal and the second digital signal and for converting the second digital signal into the signal indicative of the result of multiplication based on the generated control signal. Signal conversion by the means for generating signals indicative of the result of multiplication is carried out by a gate circuit adapted to convert, based on a given control signal, the applied second digital signal into a signal indicative of the result of multiplication of these signals.

The digital filter in accordance with the present invention comprises the above described signal processing circuit for multiplication and a prescribed number of delay means.

The control signal generating circuit of the present invention generates one or more control signals in response to a first digital signal indicative of the multiplication coefficient. The control signal is provided as a possible combination of the first digital signal (multiplication coefficient) in decimal notation.

The circuit for generating signals indicative of the result of multiplication converts an input data (second digital signal) based on the generated control signal, into a digital signal indicative of the result of multiplication. The signal indicative of the result of digital multiplication represents the result of multiplication in decimal notation. In this means for generating signals indicative of the result of multiplication, the input data (digital signal) is simply converted by the control signal. Therefore, unlike the conventional multipliers, ripple carries are not generated, and what is done is simply a signal conversion by the logic gate, which enables high speed multiplication. The control signal generating circuit is capable of generating a plurality of control signals so that a plurality of multiplication coefficients can be generated. Accordingly, even if the multiplication coefficient is changed, the input data is converted based on the control signal, so that high speed multiplication is possible.

The result of multiplication is converted into an analog current signal by an analog current converting circuit. The analog current converter generates current signals corresponding to decimal numbers indicative of the results of multiplication from the means for generating signals indicative of the result of multiplication, which means that no D/A converter is required.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A and 5B show a method of implementing the structure of the control signal generating circuit in accordance with the present invention, illustrating process of generating control signals;

FIGS. 9A through 9E show states of respective signals for illustrating operation of the signal processing circuit for multiplication in accordance with one embodiment of the present invention.

DESCRIPTION OF THE PREFERRED EMBODIMENTS

Figure 1:
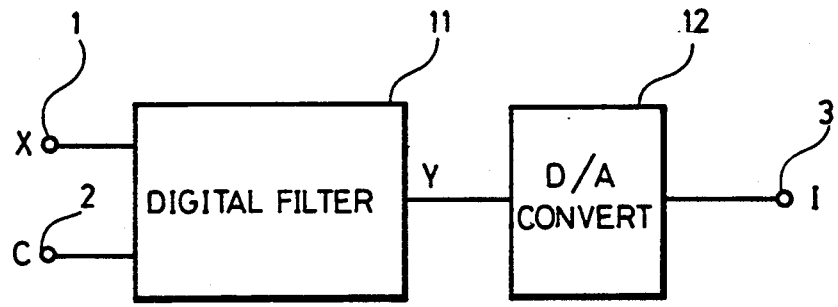
FIG. 1 shows a schematic structure of a signal processing system employing a conventional digital filter.
Figure 2:
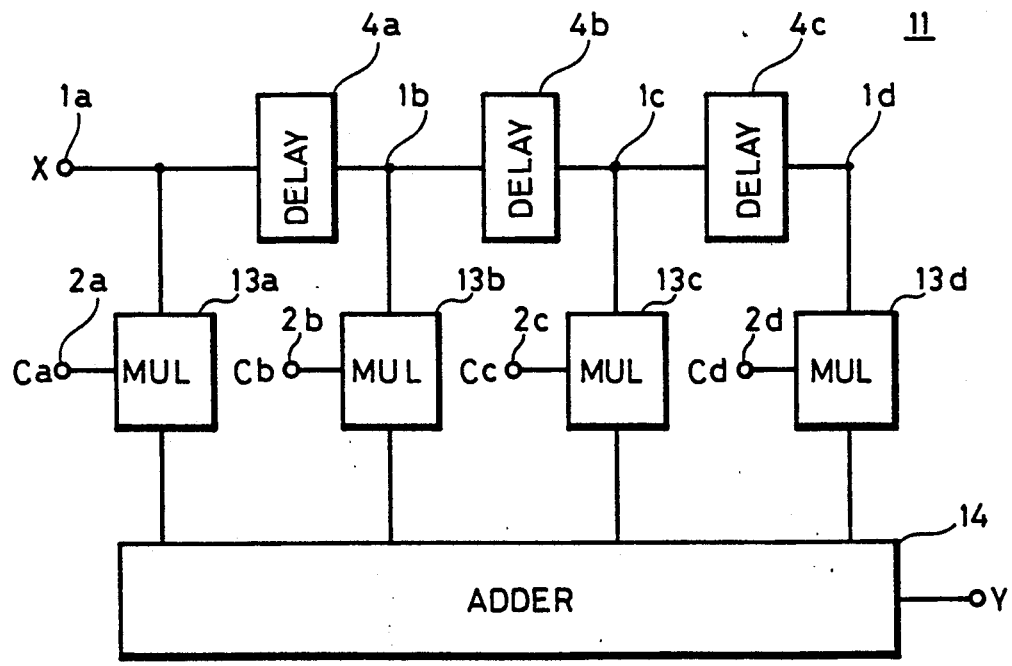
FIG. 2 shows one example of a structure of the conventional digital filter.
Figure 3:
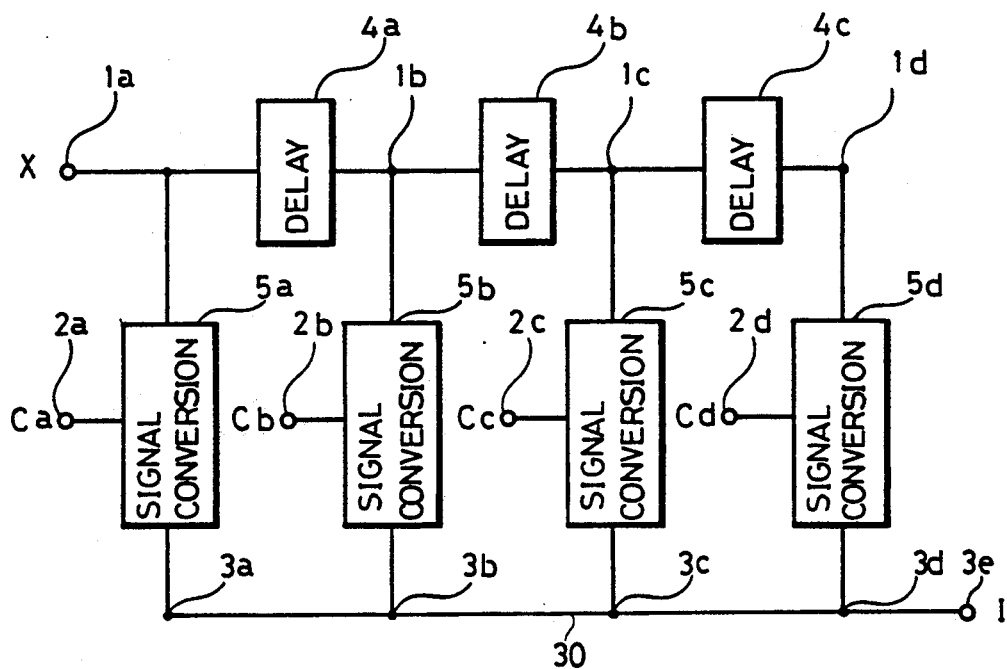
FIG. 3 schematically shows a structure of a FIR digital filter employing a signal processing apparatus for multiplication in accordance with one embodiment of the present invention.

FIG. 3 schematically shows a structure of a digital filter employing a signal processing circuit for multiplication in accordance with the present invention. Referring to FIG. 3, the digital filter which is one embodiment of the present invention comprises three stages of cascade connected delay circuit 4a, 4b and 4c, and signal converters (signal processing apparatuses for multiplication) 5a, 5b, 5c and 5d for multiplying input signals by multiplication coefficients C (hereinafter the letter C represents the multiplication coefficients Ca to Cd) and converting the results of multiplication into analog current signals. The analog current signals from the signal converters 5a, 5b, 5c and 5d are wired-OR coupled to an output signal line 30 at nodes 3a, 3b, 3c and 3d where the respective analog current signals are added. The signal line 30 is connected to an output terminal 3e.

The signal converter 5a multiplies the digital input signal from an input terminal 1a by the multiplication coefficient Ca and transmits a signal indicative of the result of multiplication to the node 3a. The signal converter 5b multiplies the output from the delay circuit 4 at the node 1b by the multiplication coefficient Cb from the input terminal 2b and transmits an analog signal indicative of the result of multiplication to the node 3b. The signal converter 5c multiplies the output from the delay circuit 4b at the node 1c by the multiplication coefficient Cc from an input terminal 2c and transmits an analog current signal indicative of the result of multiplication to the node 3c. The signal converter 5d multiplies the output from the delay circuit 4c on the node 1d by the multiplication coefficient Cd from an input terminal 2d and transmits an analog signal current indicative of the result of multiplication to the node 3d.

Figure 4:
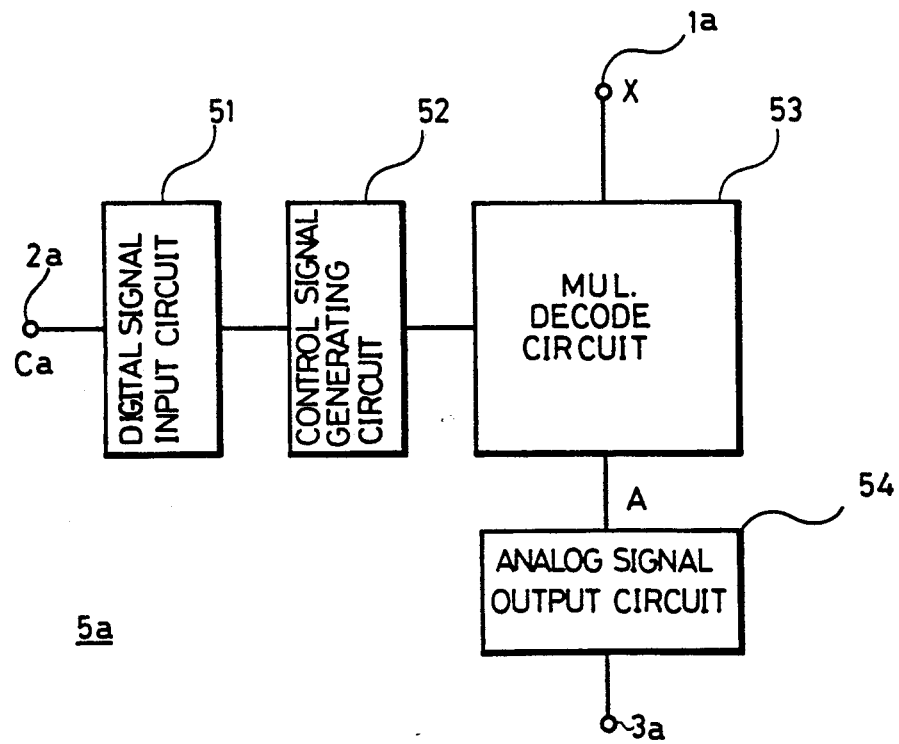
FIG. 4 shows a schematic structure of a signal converter (signal processing apparatus for multiplication) shown in FIG..3.

The multiplication coefficients Ca to Cd are digital signals for determining characteristics of the digital filter. The digital signals (multiplication coefficients) Ca to Cd may be fixed or variable. FIG. 4 schematically shows a structure of the signal converter 5a. The signal converters 5a, 5b, 5c and 5d have the same structure as shown in FIG. 4.

Referring to FIG. 4, the signal converter (signal processing apparatus for multiplication) 5a comprises a digital signal input circuit 51, a control signal generating circuit 52, a multiplication decode circuit 53 and an analog signal output circuit 54.

The digital signal input circuit 51 receives a digital signal Ca indicative of the multiplication coefficient applied through an input terminal 2a. The control signal generating circuit 52 generates prescribed one or plurality of control signals out of a plurality of control signals prepared in advance, in response to the digital signal Ca from the digital signal input circuit 51. As will be described later, the control signals generated from the control signal generating circuit 52 indicate, in decimal notation, divisors of the multiplication coefficient Ca.

The multiplication decode circuit 53 converts the input digital signal X from the input terminal 1a based on the control signal or signals from the control signal generating circuit 52 to provide a signal indicative of the result of multiplication of the digital signal X by the digital signal Ca.

The analog signal output circuit 54 supplies a current flow corresponding to the signal indicative of the result of multiplication from the multiplication decode circuit 53. The structures of the respective circuits shown in FIG. 4 will be described in the following.

The digital signal input circuit 51 is formed of an n bit shift register, for example, enabling input of n bit digital signals. The n bits of digital signals Ca are inputted to the n bit shift register serially or in parallel from the input terminal 2a.

The structure of the control signal generating circuit 52 will be described in the following. Prior to the description of the specific structure of the control signal generating circuit 52, the process of generation of the control signal or signals and the signal indicative of the result of multiplication will be described with reference to FIGS. 5A and 5B.

For the purpose of simplicity, FIG. 5A shows a case in which the multiplication coefficient (multiplier) Ca and the input (multiplicand) X are digital signals having the width of 2 bits, respectively. The reference characters X0 and X1 shown in FIG. 5A are the digital input signals X represented in binary notation, in which X0 represents the lower bit while X1 represents the upper bit. Each of the numerals 0 to 3 in the sections or the boxes of FIG. 5A represents the multiplication coefficient Ca in decimal notation. The multiplication coefficient Ca is a 2 bit digital signal, the possible range of which is "00" (binary) to "11" (binary), that is, 0 to 3 as represented in the decimal notation. The reference characters A1 to A9 represent digital signals provided by decoding the input digital signal X by the control signal. The suffixes 1 to 9 of the reference characters A1 to A9 show the results of multiplication of the 2 bit input signal X by 2 bit multiplication signal Ca in decimal notation.

The arrangements of the coefficients in FIG. 5A will be more specifically described in the following. In the arrangement shown in FIG. 5A, the position of entry of the numeral (in decimal notation) indicative of the multiplication coefficient corresponds to the bit position at which the input digital signal X bit is "1 (logic high)", which numeral is arranged at the column Ai (i=1, 2, 3, 4, 6 and 9) where the result of multiplication of the corresponding multiplication coefficient by the input digital signal is given.

For example, if the value of the input digital signal X is 2 (in decimal notation), the coefficient number (in decimal notation) is located at the position of the bit X1, since the following equation applies, that is, (X1, X0)=(1, 0). For example, if the value of the multiplication coefficient Ca is 3 (in decimal notation), the result of multiplication will be 2·3=6, and therefore 3 is located at the column of A6. Namely, when the input digital signal X and the digital signal Ca indicating the multiplication coefficient are both represented by 2 bits in binary notation, the results of multiplication will be 1, 2, 3, 4, 6 and 9 only, so that the respective coefficients are arranged to fill the table. Detailed description will be given in the following.

(1) The result of multiplication becomes 1 (in decimal notation) only when the input digital signal X and the multiplication coefficient Ca are both 1 (in decimal notation), so that the numeral 1 is written at the position of bit X0 in the column A1.

(2) The result of multiplication becomes 2 (in decimal notation) when the combination of the input digital signal X and the multiplication coefficient Ca, (X, Ca) is (1, 2) and (2, 1). In the following, the numerals indicated by the signals are in decimal notation unless it is noticed otherwise. Therefore, in the column of A2, the numeral 2 is written at the position of bit X0 and the numeral 1 is written in the position of the bit X1.

(3) The result of multiplication becomes 3 when (X, Ca) is (1, 3) and (3, 1). Therefore, the numeral 1 is written in the positions of the bits X1 and X0 of the column A3, and the numeral 3 is written in the position of the bit X0.

(4) The result of multiplication becomes 4 only when (X, Ca) is (2, 2). Therefore, the numeral 2 is written in the position of the bit X1 in the column of A4.

(5) The result of multiplication becomes 6 when (X, Ca) is (2, 3) and (3, 2). Therefore, when the input digital signal X is 3, the bits X1 and X0 are both "1". Therefore, the numeral 2 is written in both of the bits X1 and X0 of the column A6, and when the signal X is 2, the numeral 3 is written in the position of the bit X1 in this column.

(6) The result of multiplication becomes 9 only when (X, Ca) is (3, 3). Therefore, the numeral 3 is written in both bit X1 and X0 of the column A9. The decoding (signal conversion) shown in FIG. 5A enables provision of the signal Ai indicative of the result of multiplication of the input digital signal X by the multiplication coefficient Ca at high speed.

FIG. 5B shows the numerals (coefficients) of FIG. 5A replaced by control signals S0 to S5.

As shown in FIG. 5B, six different signals are prepared as control signals S0 to S5 which can be generated corresponding to the multiplication coefficients Ca. More specifically, the control signal S0 represents the coefficient 0, the control signal S1 represents the multiplication coefficient 1, the control signal S2 represents the multiplication coefficient 2 and the control signal S3 represents the multiplication coefficient 3. The control signal S4 shows a case in which the multiplication coefficient is 1 or 3. The control signal S5 indicates a case in which the multiplication coefficient is 2 or 3.

Accordingly, when the digital signal indicative of the multiplication coefficient provided from the input terminal 2a indicates 3 (in decimal notation), control signal S3, S4 and S5 are generated.

Now, "generation" of the control signal means that one or more of the six control signals S0 to S5 are set to the "active state". One of the output signals A1, A2, A3, A4, A6 and A9 is activated in accordance with the signal conversion shown in FIGS. 5A and 5B, which activated signal indicates the result of multiplication. The method of generating the control signals S0 to S5 and the specific structure of the control signal generating circuit 52 will be described in the following.

FIG. 6 shows relations between the control signals S0 to S5 and the digital signal Ca indicative of the multiplication coefficients in logical expressions. The control signal S0 is activated when the coefficient Ca is 0. Now, when we represent the multiplication coefficient Ca by C1 and C0 (where C1 is the upper bit and C0 is the lower bit), then the control signal S0 is provided by a logical product of the negation of the bit C0 and the negation of the bit C1.

The control signal S1 is generated only when the multiplication coefficient Ca is 1. Therefore, the control signal is provided by the logical product of the bit C0 and the negation of the bit C1.

The control signal S2 is generated when the multiplication coefficient Ca is 2. Therefore, the control signal S2 is provided by the logical product of the bit C1 and the negation of the bit C0.

The control signal S3 is generated when the coefficient Ca is 3. Therefore, the control signal S3 is provided by the logical product of the bits C0 and C1.

The control signal S4 is generated when the multiplication coefficient Ca is 1 or 3. Therefore, the control signal S4 is provided by the logical sum of the control signals S1 and S3, and as a result, the control signal S4 becomes equal to the bit C0.

The control signal S5 is generated when the multiplication coefficient Ca is 2 or 3, so that it is provided by the logical sum of the control signals S2 and S3, and accordingly, it becomes equal to the bit C1 as a result.

Figures 6A, 6B:
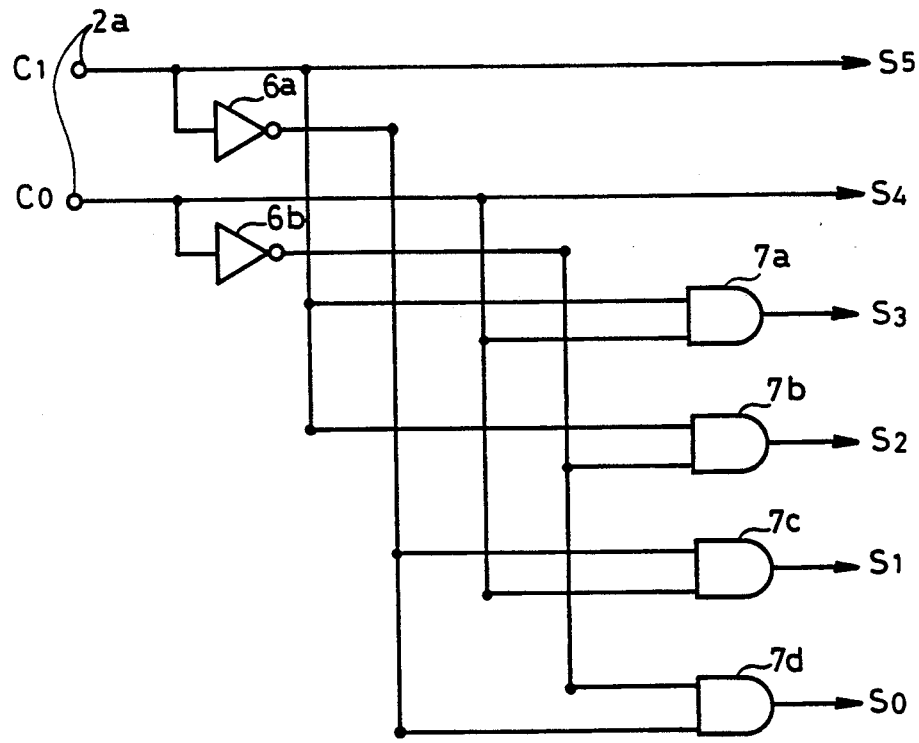
FIGS. 6A and 6B show logic relation between the multiplication coefficients and the control signals, and the circuit structure generating the control signals, illustrating one example of the structure of the control signal generating circuit 52 shown in FIG. 3.

One example of a circuit structure realizing the logical relations of FIG. 6A is shown in FIG. 6B. The circuit structure shown in FIG. 6B is an example of the specific structure of the control signal generating circuit 52 shown in FIG. 4. Referring to FIG. 6A, the control signal S5 is generated in response to the 2 bit multiplication coefficient Ca, that is, the upper bit C1 of (C1, C0) applied to the input terminal 2a. The control signal S4 is generated in response to the lower bit C0 of the multiplication coefficient Ca. The control signal S3 is provided from an AND gate 7a receiving the lower bit C0 and the upper bit C1. The control signal S2 is generated from an AND gate 7b receiving the upper bit C1 and an inverted signal of the lower bit C0 through the inverter 6b. The control signal S1 is generated from an AND gate 7c receiving the lower bit C0 and the inverted signal of the upper bit C1 through the inverter 6a.

The control signal S0 is generated from an AND gate 7a receiving an inverted signal of the lower bit C0 through the inverter 6b and the inverted signal of the upper bit C1 through the inverter 6a.

By the above described control signal generating circuit, one or a plurality of corresponding control signals are generated in response to the digital signal Ca which is the data of the multiplication coefficient.

Namely, the control signals S0 to S5 are generated by decoding the multiplication coefficient digital signal Ca.

Although inverters and AND gates are employed in the structure of FIG. 6B, other logic circuits may be employed to provide the same effect, provided that the logical expressions shown in FIG. 6A are satisfied.

Instead of the structure shown in FIG. 6B, a ROM (Read Only Memory) may be employed, which receives the digital signal Ca indicative of the multiplication coefficient as the address input and stores 6 bit data in the form of a table so as to generate corresponding control signals. When the ROM is used, corresponding control signals are generated with the digital signals C1 and C0 used as addresses.

Figure 7:
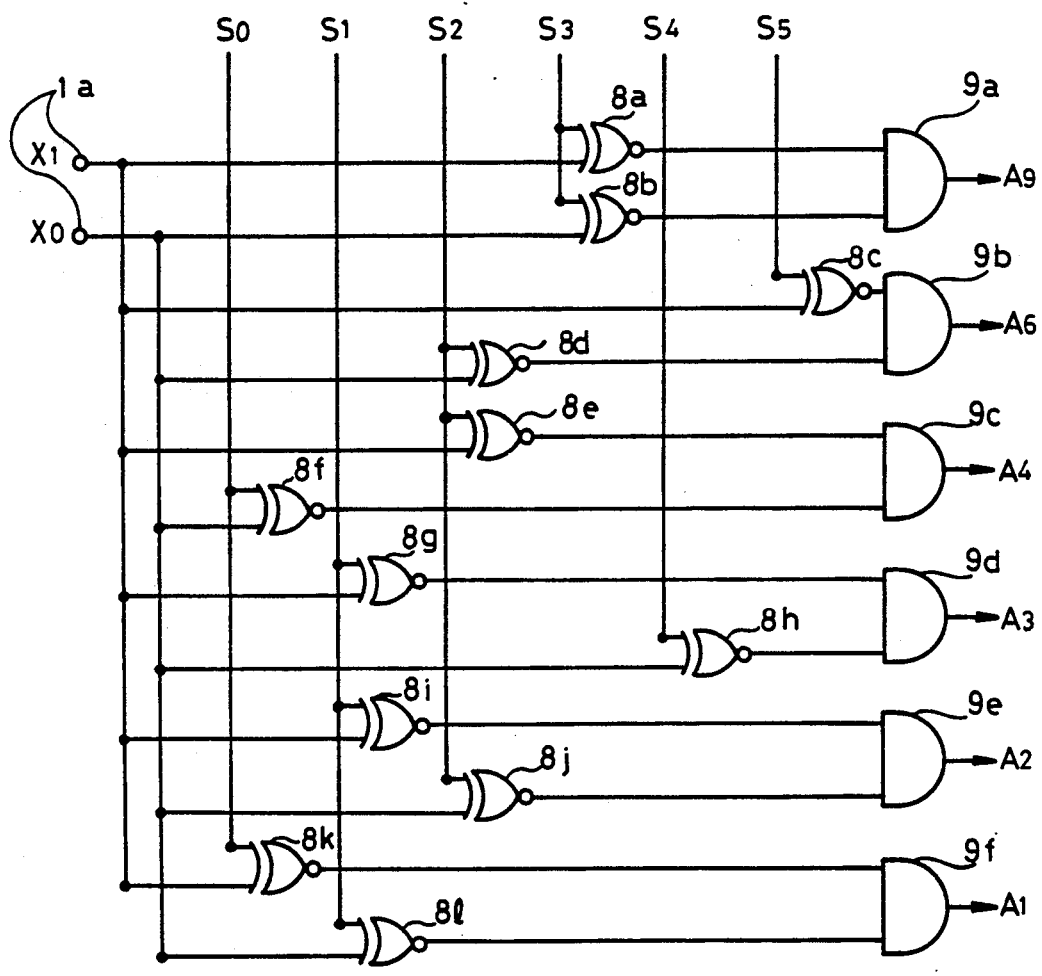
FIG. 7 shows a structure of a multiplication decode circuit shown in FIG. 4.

The structure of the multiplication decode circuit 53 shown in FIG. 4 will be described in the following with reference to FIG. 7. The circuit shown in FIG. 7 is adapted to decode the input digital signal X by the control signals S0 to S5 with the result of decoding indicating one of the results of multiplication A1 to A9. More specifically, referring to FIG. 5B, the column Ai, in which the bits X1 and X0 of the input digital signal X and the control signal coincide in pattern with each other, is activated.

Namely, when the multiplication coefficient Ca designates 3 (in decimal notation), the control signals S3, S4 and S5 are generated. In this case, when the digital signal X is 2 ("10" in binary notation), the bit X1 is at the "H" level and the bit X0 is at the "L" level. Consequently, the column A6 is activated in which the bit X1 and the control signal S5 which are at "H" level, and the bit X0 and the control signal S2 which are at the "L" level (not generated), coincide with each other in each combination.

When the multiplication coefficient Ca indicates 1, the control signals S1 and S4 are generated. In this case, when the input digital signal X is 1 ("01"), the decode signal A1 is activated by the control signal S1 arranged at the bit position X0.

In the same manner, when the digital signal X is 2 ("10") and Ca=1, the signal A2 defined by the intersection of the bit X1 and the control signal S1 is activated, since the bit X0 is 0 and the control signal S2 is at the "L" level.

Meanwhile, when the input digital signal X is 3 ("11") and if the multiplication coefficient Ca is 1, whether the bits of the input signal X, the control signal S1 and the control signal S4 coincide with each other must be checked. Therefore, the column A3 is activated in which the intersection of the bit position X1 and the control signal S1 and the intersection of the bit X0 and the control signal S4 are both included. Namely, when the upper bit X1 is "H", two columns A2 and A3 are defined by the control signal S1. However, either the column A2 or A3 is selected in accordance with the value of the lower bit X0.

Referring to FIG. 7, the multiplication decode circuit 53 comprises 2-input exclusive NOR circuits 8a to 8l for detecting coincidence of the applied signals and 2-input AND circuits 9a to 9f providing logical product of the applied signals.

The exclusive NOR circuit (EXNOR circuit) 8a receives the upper bit X1 of the input digital signal X and the control signal S3. The EXNOR circuit 8b receives the control signal S3 and the lower bit X0 of the input digital signal X. The EXNOR circuit 8c receives the control signal S5 and the upper bit X1. The EXNOR circuit 8d receives the control signal S2 and the lower bit X0. The EXNOR circuit 8f receives the control signal S0 and the lower bit X0. The EXNOR circuit 8g receives the control signal S1 and the upper bit X1. The EXNOR circuit 8h receives the control signal S4 and the lower bit X0. The EXNOR circuit 8i receives the control signal S1 and the upper bit X1. The EXNOR circuit 8j receives the control signal S2 and the upper bit X0. The EXNOR circuit 8k receives the control signal S0 and the upper bit X1. The EXNOR circuit 8l receives the control signal S1 and the lower bit X0.

The AND circuit 9a receives the outputs from the EXNOR circuits 8a and 8b. The AND circuit 9b receives the outputs from the EXNOR circuits 8c and 8d. The AND circuit 9c receives both outputs from the EXNOR circuits 8e and 8f. The AND circuit 9d receives outputs from the EXNOR circuits 8g and 8h. The AND circuit 9e receives the outputs from the EXNOR circuits 8i and 8j. The AND circuit 9f receives the outputs from the EXNOR circuits 8k and 8l.

The AND circuit 9a generates a decode signal A9 indicative of the result of multiplication "9". The AND circuit 9b outputs a decode signal A6 indicative of the result of multiplication "6". The AND circuit 9c generates a decode signal A4 indicative of the result of multiplication "4". The AND circuit 9d outputs a decode signal A3 indicative of the result of multiplication "3". The AND circuit 9e outputs a decode signal A2 indicative of the result of the multiplication "2". The AND circuit 9f outputs a decode signal A1 indicative of the result of multiplication "1".

When the result of multiplication is 0, no decode signal is generated, and all the signals A1, A2, A3, A4, A6 and A9 are kept at the inactive state of "L" level.

The operation will be briefly described in the following. The EXNOR circuit outputs an active signal of the "H" level when applied two signals coincide in level with each other. The AND circuit outputs an active signal of the "H" level when the applied signals are both "H" level. Therefore, when the control signal S0 and the upper bit X1 coincide with each other and the control signal S1 and the lower bit X0 coincide with each other, then the AND circuit 9f outputs a "H" level signal, namely, the decode signal A1.

The AND gate 9e generates the decode signal A2 when the control signal S1 and the lower bit X1 coincide with each other and the control signal S2 and the lower bit X0 coincide with each other.

The AND circuit 9d generates an active signal to provide the decode signal A3 when the control signal S1 and the upper bit X1 coincide with the each other and the control signal S4 and the lower bit X0 coincide with each other.

The AND circuit 9c generates the decode signal A4, when the control signal S2 and the upper bit X1 coincide with each other and the control signal S0 and the lower bit X0 coincide with each other.

The AND circuit 9b generates the decode signal A6 when the control signal S5 and the upper bit X1 coincide with each other and the control signal S2 and the lower bit X0 coincide with each other.

The decode signal A9 is generated from the AND circuit 9a when the control signal S3 and the upper bit X1 coincide with each other and the control signal S3 and the lower bit X0 coincide with each other.

By signal-converting or decoding the input digital signals X by the control signals S0 to S5 in accordance with the above described structure, any one of the decode signals A1, A2, A3, A4, A6 and A9 is generated, whereby a signal indicative of the result of multiplication of the input digital signal X by the multiplication coefficient Ca is provided at high speed.

Figure 8:
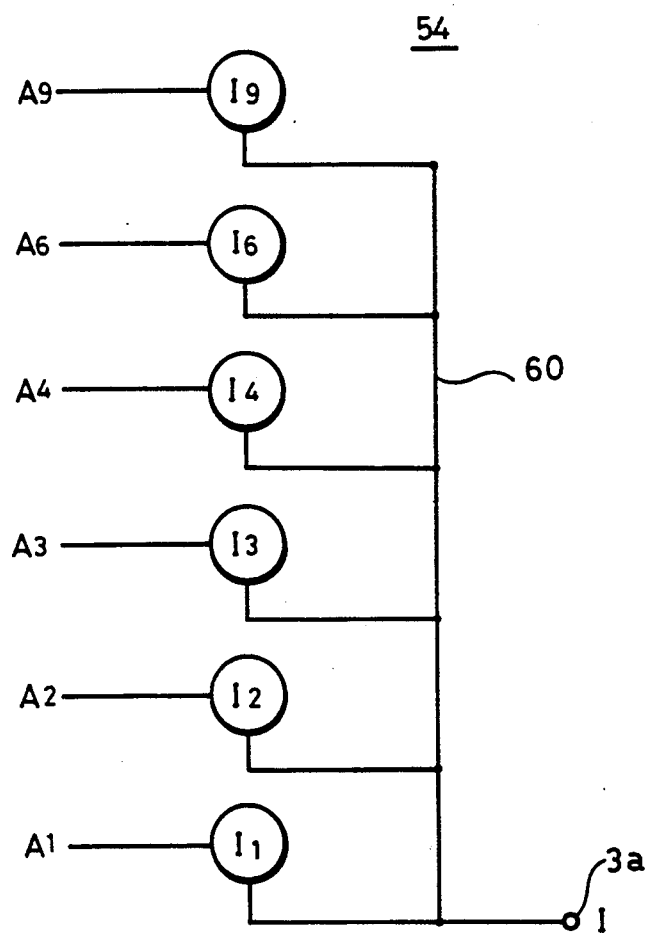
FIG. 8 shows a schematic structure of an analog signal output circuit shown in FIG. 4.

An example of a specific structure of the analog signal output circuit 54 is shown in FIG. 8. Referring to FIG. 8, the analog signal output circuit 54 comprises current sources I1, I2, I3, I4, I6 and I9 provided corresponding to the decode signals A1, A2, A3, A4, A6 and A9 from the multiplication decode circuit, respectively. The current sources I1, I2, I3, I4, I6 and I9 have weights corresponding or proportional to the suffixes, and supply currents corresponding to the weights to a signal line 60. By this structure, currents corresponding to the results of multiplication are transmitted through the signal line 60 to the node 3a in response to the decode signals from the multiplication decode circuit 53. Namely, in the structure shown in FIG. 8, one of the current sources I1 to I9 is activated in correspondence with one of the decode signals A1 to A9, whereby the current corresponding to the result of multiplication is supplied to the signal line 60. Consequently, the result of multiplication is transmitted to the node 3a. Operation of a signal processing circuit (signal converter) for multiplication, which is one embodiment of the present invention, will be described in the following with reference to FIGS. 9A through 9E.

Now, let us consider a case in which the multiplication coefficient Ca is 3 (in decimal notation) as shown in FIG. 9A). In this case, since the coefficient Ca is represented in 2 bits, C1 is "1" and C0 is "1". Let us assume that the input digital signal X is 2 (in decimal notation) as shown in FIG. 9B. In this case, the upper bit X1 is "1" and the lower bit X0 is "0".

The control signal generating circuit 52 generates three control signals S3, S4 and S5 corresponding to the coefficient 3, as shown in FIGS. 6A and 6B. On this occasion, the control signals S0 to S2 are "0" (logic low level) (see FIG. 9C). The input digital signal X is now decoded by the multiplication decode circuit 53 shown in FIG. 7. In this case, the control signals S3 to S5 are at the "H" level and the control signals S0 to S2 are at the "L" level ("0"). Accordingly, as is apparent from the circuit of FIG. 7 and the table shown in FIG. 5B, the decode signal A6 is generated (see FIG. 9D). In response to the decode signal A6, the current source I6 is activated, supplying the current flow indicative of the result of multiplication 6 onto the signal line 60.

Figure 10:
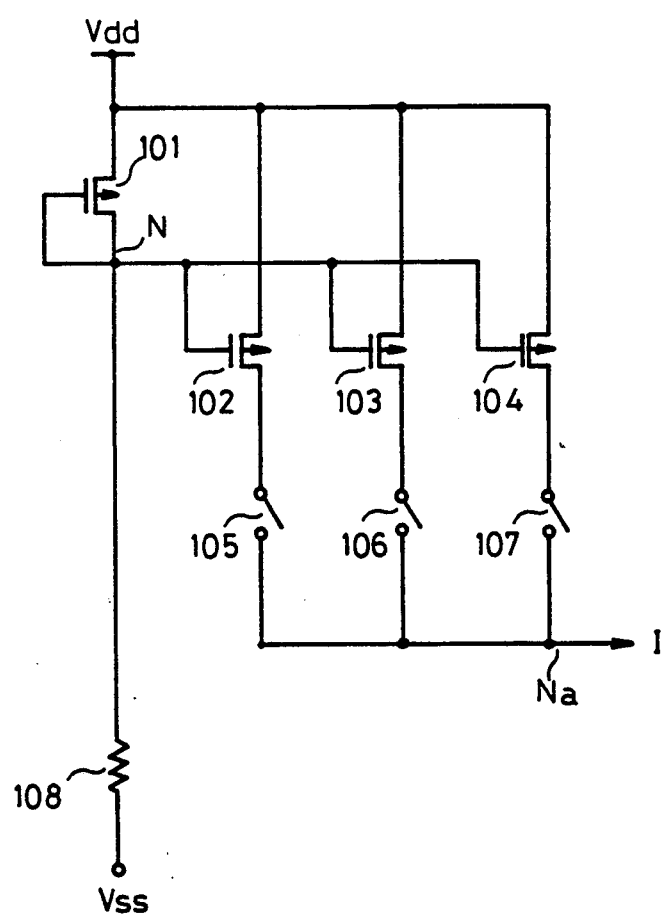
FIG. 10 shows an example of a specific structure of a current source shown in FIG. 8.

FIG. 10 shows one example of the specific structure of the current source. Referring to FIG. 10, the current source comprises p channel MOS transistor 101, 102, 103 and 104 and switching elements 105, 106 and 107. The p channel MOS transistor 101 has its gate and drain connected together to one terminal of a resistance 108. The p channel MOS transistor 101 has its source connected to a supply potential Vdd. The other terminal of the resistance 108 is connected to the other reference potential (ground potential) Vss. The p channel MOS transistor 102 has its gate connected to a node N, one conductive terminal connected to the supply potential Vdd and the other conductive terminal connected to one terminal of the switching element 105. In the same manner, each of the p channel MOS transistors 103 and 104 has its gate connected to a node N4, one conductive terminal connected to the supply potential Vdd, and the other conductive terminal connected to one terminal of the switching element 106 or 107, respectively. The other terminal of each of the switching elements 105 and 106 is connected to an output node Na. The operation will be briefly described.

The MOS transistor 101 has its drain and gate connected together and it is in a saturated state. The gate potential of each of the MOS transistors 102, 103 and 104 is the same as the gate potential of the MOS transistor 101. The drain current flowing through the MOS transistor 101 is determined by the conductance value and the potential difference between the gate and the source of the MOS transistor 101. When the MOS transistor 102 is in the saturated state and the switching element 105 is rendered conductive, the current flowing to the node Na is determined by the drain current flowing through the MOS transistor 101 and the conductance values of the MOS transistors 101 and 102. Namely, a voltage is generated through the resistance 108 by the drain current flowing through the MOS transistor 101, which voltage is applied to the gate of the MOS transistor 102, keeping the MOS transistor 102 in the saturated state. Therefore, by rendering conductive the switching element 105, a constant current determined by the conductance value inherent to the MOS transistor 101 and the potential of the node N flows. The potential of the node N is determined by the drain current of the MOSFET 101.

If the switching elements 105, 106, and 107 are formed of N channel MOS transistors receiving the decode signals A1, A2 and A3 shown in FIG. 8, respectively, the conductance ratio of the MOS transistors 102, 103 and 104 are set as 1:2:3 and the ratio of the conductance values of corresponding n channel MOS transistors are also set to 1:2:3, then currents indicative of the results of multiplication 1, 2 and 3 are transmitted to the node Na by rendering conductive the corresponding one of the switching elements. Therefore, in order to provide current values corresponding to the decode signals A4, A6 and A9, switching MOS transistors may be connected in parallel to the MOS transistors 102, 103 and 104, whereby current sources supplying currents with desired weights can be provided.

Alternatively, the MOS transistors 102, 103 and 104 may be formed of MOS transistors having the same conductance value and the transistors may be adapted such that only one MOS transistor is turned on for the current source I1, two MOS transistors 102 and 103 are turned on for the current source I2 and three MOS transistors 102 to 104 are simultaneously turned on for the current source I3, to provide the same effect.

The above described structure of the signal processing circuit for multiplication is the same in the signal converting circuits 5b, 5c and 5d shown in FIG. 3. Therefore, when a digital filter such as shown in FIG. 3 is formed by using the signal circuits for multiplication, the multipliers and the D/A converter enlarging the scale of the circuit become unnecessary, whereby a compact digital filter having simple circuit structure can be formed, and accordingly, a digital filter can be easily realized in an integrated circuit.

The operation of the digital filter employing the above described signal processing circuit for multiplication will be briefly described in the following. A digital signal which will be a multiplicand is transmitted to the input terminal 1a. The digital signal is delayed for a prescribed time period in the delay circuits 4a, 4b and 4c, respectively. The signal converters 5a, 5b, 5c and 5d receive the input signals which will be the multiplicand from the nodes 1a, 1b, 1c and 1d and the multiplication coefficients Ca, Cb, Cc and Cd from the input terminals 2a to 2d, decode the same (by signal converting) into the signals indicative of the results of multiplication, and further convert the same into analog current signals to transmit the same to the corresponding nodes 3a to 3d. Analog current signals from respective signal converters 5a to 5d are transmitted to the signal line 30 and, the sum of the analog current signals, that is, an analog current signal after the addition of the results of multiplication is provided on the output terminal 3e.

The analog current signal can be converted into an analog voltage signal by using a current-voltage converting resistance element or the like, which is appropriately selected corresponding to the circuit structure to which it is applied.

In the above embodiment, the methods of generating control signals and signals indicative of the results of multiplication have been described with the input data X and the multiplication coefficient C being both 2 bits.

However, the methods can be extended to n bits. As to the method of generating control signals, the signals can be provided by finding divisors of a value which is within a product of a maximum input signal value and a maximum multiplication coefficient. In order to provide the decode signals indicative of the results of multiplication by decoding, a table such as shown in FIGS. 5A and 5B may be formed and the circuit may be structured in accordance with the coincidence/non-coincidence or exclusive NOR of the control signals and the input data at each bit position and in accordance with the logical product thereof in respective columns. By doing so, the method can be easily extended to the n bit structure.

In the above described embodiment, only one decode signal indicative of the result of multiplication is activated, namely, generated. However, the structure may be adapted to generate a plurality of decode signals which provide in combination a multiplication result, to provide the same effect as in the above embodiment.

Although FIR structure is used as an example of a digital filter in the foregoing, the present invention may be applied to other types of digital filters, for example, an IIR (Infinite Impulse Response) type digital filter.

As described above, according to the present invention, one or more control signals are generated based on the multiplication coefficients, each of the control signals indicating the multiplication coefficient in decimal notation, the input data are processed by the gates based on the control signals to be converted into analogue signals indicative of the results of multiplication, whereby multiplication of digital signals and conversion of the digital signals into analog signals can be simultaneously carried out at high speed in a simple circuit structure. The multiplication and D/A conversion can be carried out by simple signal conversion without using arithmetic means such as multipliers and adders. Therefore, the maximum propagation path of the signals to be processed can be shortened, enabling high speed multiplication. In addition, even if the bit length of the digital signals to be processed is long, the conversion path of the input digital signal can be maintained in length as it is by virtue of the control signals. Namely, the maximum propagation path of the digital signals is not changed, whereby high speed multiplying process can be carried out independent of the bit length of the digital signals to be processed.

When the multiplication coefficients in the digital filter are set in advance and fixed during the operation, the maximum propagation path of the digital signals to be processed can be further shortened, improving the speed of operation of the digital filter. Namely, since the path for generating the control signals is fixed, the signal propagation path in this portion is made shorter, improving the speed of operation of the digital filter.

By the above described structure, signal processing for multiplication capable of high speed multiplying operation in a simple circuit structure can be realized, and by using the signal processing circuit for multiplication, a digital filter suitable for higher degree of integration can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for multiplying a first digital signal as a multiplier by a second signal as a multiplicand, comprising:

control signal generating means responsive to said first digital signal for generating at least one control signal indicative of a multiplier defined by said first digital signal, said control signal generating means comprising decoder means receiving said first digital signal for decoding the same into a decoded signal indicative of the magnitude thereof in decimal notation to generate said at least one control signal indicating at least one multiplier value in decimal notation;

multiplication means responsive to said second digital signal and to said control signal generating means for generating a multiplied signal indicative of a result of multiplication of said first digital signal by said second digital signal, said multiplication means including means for logically processing said control signal and said second signal thereby converting said second digital signal into said multiplied signal; and current converting means for converting said multiplied signal into an analog current signal of a corresponding magnitude.

2. An apparatus according to claim 1, wherein
said multiplied signal represents one value of a plurality of different results of multiplication represented in decimal notation, and
said decoder means comprises output means for providing a plurality of control signals comprising a first group of control signals and a second group of control signals, said first group of control signals each being indicative of a single multiplier value in decimal notation and second group of control signals each being indicative of a plurality of multiplier values representing a set of divisors of a multiplication result in decimal notation.

3. An apparatus according to claim 1, wherein
said decoder means comprises:
first means for receiving, in parallel, each bit of said first digital signal in binary notation, and
second means responsive to said first means for producing said at least one control signal,
said second means comprising means for providing a divisor in decimal notation for each possible product of multiplication with said second digital signal and for correlating each bit of said first digital signal with an associated divisor to produce said at least one control signal.

4. An apparatus according to claim 3, wherein
said second means comprises detecting means for detecting coincidence between a bit pattern of said second digital signal and a given pattern of control signals, and
said multiplication means comprises selecting means for activating a signal indicative of the result of multiplication corresponding to detected coincidence.

5. An apparatus according to claim 1, wherein
said multiplication means for generating a multiplied signal indicative of the result of multiplication comprises detecting means for detecting coincidence between each bit value of said second digital signal and each logical level of said control signals, and
selecting means responsive to an output from said detecting means for generating a signal indicative of the corresponding result of multiplication, said selecting means including means for activating one of the plurality of signals indicative of the results of multiplication.

6. An apparatus according to claim 1, wherein
said multiplied signal represents one value of a plurality of different results of multiplication, and
said current converting means comprises a plurality of current suppliers, each corresponding to one of the plurality of different results of multiplication and having a current magnitude corresponding to a respective resulting value of multiplication, each of said plurality of current suppliers being activated in response to a corresponding signal indicative of the result of multiplication and supplying a current corresponding to said result of multiplication to a common signal line, said signal line commonly connected to outputs of said plurality of current suppliers.

7. A method for carrying out multiplication of a first digital signal as a multiplier by a second digital signal as a multiplicand, comprising the steps of:
generating at least one control signal in response to said first digital signal to indicate a multiplier defined by said first digital signal;
generating, in response to said second digital signal and to said generated control signal, a multiplier signal indicative of a result of multiplication of said first digital signal and said second digital signal, said step of generating said multiplied signal including the step of logically processing said at least one control signal and said second digital signal and converting said second digital signal into said multiplied signal based on said at least one control signal; and
converting said multiplied signal into an analog current signal of a corresponding magnitude.

8. A method according to claim 7, wherein
said step of generating the control signal comprises the step of decoding said first digital signal to generate the corresponding control signal.

* * * * *